United States Patent [19]

Campion et al.

[11] 4,201,449
[45] May 6, 1980

[54] SCREEN

[76] Inventors: John S. Campion, 667 W. Wrightwood; Van E. Steed, 104 W. Natoma, both of Addision, Ill. 60101

[21] Appl. No.: 907,137

[22] Filed: May 18, 1978

[51] Int. Cl.² ............................................ G03B 21/56
[52] U.S. Cl. ..................................... 350/117; 106/20; 106/290
[58] Field of Search ................... 106/20, 290; 350/117

[56] References Cited

U.S. PATENT DOCUMENTS

| | | | |
|---|---|---|---|
| 3,341,391 | 9/1967 | Hamilton et al. | 350/117 X |
| 3,779,630 | 12/1973 | Clausen et al. | 350/117 |
| 3,811,750 | 5/1974 | Coulthard | 350/117 |
| 3,964,822 | 6/1976 | Yamashita | 350/117 |
| 4,025,160 | 5/1977 | Martinez | 350/117 |

Primary Examiner—Richard A. Wintercorn
Attorney, Agent, or Firm—Kinzer, Plyer, Dorn & McEachran

[57] ABSTRACT

A photographic front projection screen having a base with a front surface facing a projection source. A coating of aluminum ink applied to the front surface of the base to form a reflective surface with the coating of aluminum ink applied by silk screening, painting or printing. A protective coating covers the reflective surface formed by said aluminum ink.

6 Claims, 2 Drawing Figures

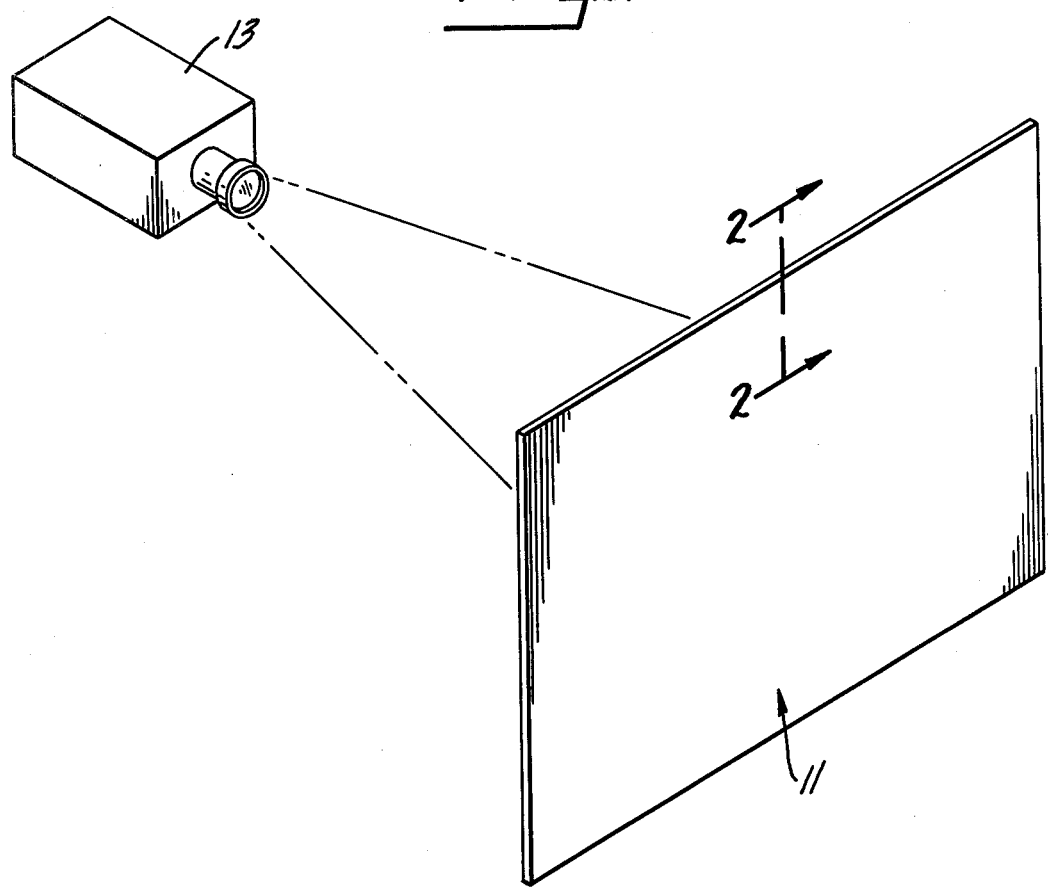
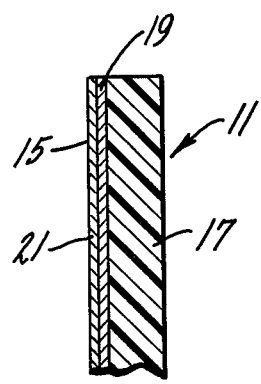

SCREEN

BACKGROUND AND SUMMARY OF THE INVENTION

The development of projection television has created a requirement for a screen having a high light reflective efficiency because the light projected by a television is much less than that projected by an ordinary movie or slide projector. Further, projection type television sets are usually used in a room that is not as dark as the ordinary motion picture theatre or projection room. Additionally, television projection screens have in the past been formed in a parabolic shape to concentrate the reflected light so the material forming the screen surface must be capable of being bent during the manufacturing process without undue distortion or damage to the screen surface.

Screen of various surface constructions have been proposed for both parabolic, single optical curve, flat stationary, flat rollup and constructed stationary type for use in both movie theatres, either indoor or outdoor, and for projection television. The screens previously manufactured have either been less than entirely satisfactory or extremely expensive to manufacture.

Therefore, an object of this invention is a front projection screen surface which can be used in parabolic, single optical curve, flat stationary, flat rollup and constructed stationary screens.

Another object of this invention is a front projection screen with a high light reflective efficiency sufficient to enable a flat screen to be used for projection television.

Another object of this invention is a screen surface that can be applied to almost any base material and is relatively inexpensive to manufacture.

Another object of this invention is a screen having a reflective surface that can be applied by silk screening, painting and printing processes.

Other objects may be found in the following specification, claims and drawings.

BRIEF DESCRIPTION OF THE DRAWINGS

The invention is illustrated more or less diagrammatically in the following drawings wherein:

FIG. 1 is a perspective view of a screen surface embodying the novel features of this invention and a projection source therefor; and FIG. 2 is an enlarged cross-sectional view taken along line 2—2 of FIG. 1.

DESCRIPTION OF THE PREFERRED EMBODIMENTS

FIG. 1 of the drawings shows a screen 11 constructed in accordance with the teachings of this invention. For simplicity of illustration, the screen is shown as flat stationary but it should be understood that it can be constructed in various shapes including parabolic, single optical curve, flat rollup and constructed stationary as well as the flat stationary which is shown. The screen is intended to be used in both indoor and outdoor theatres, for projection television and any other front projection use.

A projector 13 is shown directing a lighted image against the front projection surface 15 of the film. The projector 13 can be a standard movie or slide projector or a projection type television set.

The front projection screen 11 includes a base 17 which can be of any size and thickness which is necessary or economical for its intended use. The material of the base, its thickness and its flexibility or rigidity should be selected so that the screen will perform satisfactorily under its intended use. A reflective surface 19 is applied to the projector side of the screen base and where necessary, a protective coat 21 is applied over the reflective surface 19.

The construction of the screen 11 will depend to some degree upon its intended use. One example is a flat screen. The base 17 of such a screen can be a relatively thin sheet of plastic polyester material such as that which is sold under the trademark "MYLAR". The base is coated with the reflective surface 19 and the reflective surface is covered with a protective coat 21. The plastic sheet may be self-supporting or may be attached or fastened to a suitable backing sheet for strength and rigidity.

The reflective coating 19 on the front face of the screen base may be applied using conventional techniques such as brush, roller or spray painting, rotogravure or other printing process that can apply aluminum particles of the required size. In the preferred method, the reflective coating is applied by silk screening a metallic ink, preferably an aluminum ink, onto the polyester sheet. A suitable ink is obtained by mixing aluminum powder, in one example, an aluminum powder, which is sold under the product designation PB-63B by Advance Process Supply Company of Chicago, Illinois, with a butyl cellosolve thinner until a heavy paste is obtained. A vehicle such as an acrylic varnish is mixed with the paste in a ratio of approximately three-quarters to one and one-half pounds of aluminum powder to one gallon of vehicle. A suitable acrylic varnish for this application is sold by Advance Process Supply Company of Chicago, Illinios under the product designation RAM-780. The metallic ink thus formed is applied through a nylon monofilament screen to the polyester plastic base. The nylon monofilament screen which is used has a mesh size of approximately 160.

After the metallic ink has dried, a protective coating 21, which is preferably a clear acrylic coating, can be applied by silk screening. The finish of this coating is preferably a gloss. The use of such a coating is not necessary for the reflective properties of the screen but is to provide durability and longevity for the screen surface. As a matter of fact, the application of this protective coating reduces somewhat the reflective efficiency of the screen.

The thinners and vehicles used with the metallic powder to obtain the metallic ink can be varied in accordance with the composition of the substrate or base. Therefore, it should be understood that the above example is merely exemplary for a polyester base and may be varied as the composition of the base changes.

For example, in the construction of a parabolic screen which is usually vacuum formed, a smooth surfaced, flat, acrylonitrile-butadiene-styrene resis (ABS) sheet may be used as the base. The flat sheet is silk screened with an aluminum ink, a protective coating is applied to the ink when it has dired and the sheet is then vacuum formed to the desired shape. The thinner which is mixed with the aluminum particles to obtain a paste is of the type sold under the designation T-970 by Advance Process Supply Company of Chicago, Illinois. The vehicle used is of the type sold under the designstion ABS-780 by the same company.

The size of the aluminum particles used to create the aluminum ink may also be varied. A screen having a coarser reflective surface was obtained using an ink formed of aluminum powder of a larger particle size. An aluminum powder having this larger particle size is sold under the designation PB-75C by Advance Process Supply Company of Chicago, Illinois. The ink is applied to the base through multi-filament screens having openings as large as 8XX mesh and monofilament fabric screens having meshes as large as 83 and 90 in nylon and 86 and 110 in polyester. However, screens manufactured using this ink did not have a reflective efficiency as high as screens manufactured using ink containing the finer aluminum particles previously described.

The gain of screens manufactured in accordance with this invention was checked relative to a white magnesium oxide screen having a 100% reflectance and a completely diffusing surface. A standard projector source having a voltage regulator to maintain a constant voltage during the test was used. The light reflected from each screen was measured in foot lamberts using a brightness meter. A screen manufactured in accordance with the first example using a polyester sheet base and an aluminum ink made from an aluminum powder of the particle size sold under the designation PB-63B by Advance Process Supply Company of Chicago, Illinois, had a gain of 7.3 relative to the white magnesium oxide master screen.

A second screen having a reflective surface manufactured in accordance with the second example of this invention using an ink made from aluminum powder of the size sold under the designation of PB-75C by Advance Process Supply Company of Chicago, Illinois, and applied to a flat polyester base was also tested. It showed a reflective gain of 6.7 relative to the white magnesium oxide master screen. In contrast, a commercially available rollup screen of the white bead type sold by the Daylite Screen Company of Warsaw, Indiana, has a reflective gain of 2.2 relative to the white magnesium oxide master under the same test conditions.

We claim:

1. A photographic front projection screen including:
   a base having a front surface to face a projection source, and
   a coating of reflective aluminum ink applied to the front surface of said base.

2. The screen of claim 1 in which said coating of aluminum ink is applied by silk screening.

3. The screen of claim 1 in which said coating of aluminum ink is covered by a protective coating.

4. The screen of claim 3 in which said protective coating is a clear acrylic varnish.

5. The front projection screen of claim 3 in which said protective coating has a gloss finish.

6. The front projection screen of claim 1 in which said coating of aluminum ink contains aluminum powders carried in an acrylic varnish with said aluminum powders of a size to pass through a 160 mesh monofilament screen.

* * * * *